United States Patent
Savoie

(10) Patent No.: US 8,056,453 B2
(45) Date of Patent: Nov. 15, 2011

(54) FAST TOOL SERVO

(75) Inventor: Marc Savoie, Wetzlar (DE)

(73) Assignee: Satisloh GmbH, Wetzlar (DE)

( * ) Notice: Subject to any disclaimer, the term of this patent is extended or adjusted under 35 U.S.C. 154(b) by 1131 days.

(21) Appl. No.: 11/586,472

(22) Filed: Oct. 25, 2006

(65) Prior Publication Data

US 2007/0094857 A1 May 3, 2007

(30) Foreign Application Priority Data

Nov. 1, 2005 (DE) .......................... 10 2005 052 314

(51) Int. Cl.
*B23B 3/00* (2006.01)
*B23B 21/00* (2006.01)

(52) U.S. Cl. ............................. 82/117; 82/132; 82/162

(58) Field of Classification Search .................. 82/11.3, 82/117, 118, 133, 138, 129, 132, 904, 1.11, 82/120–122, 137, 142, 148, 149, 154, 162; 29/27 C, 27 R See application file for complete search history.

(56) References Cited

U.S. PATENT DOCUMENTS

| | | | |
|---|---|---|---|
| 3,679,272 A | | 7/1972 | Costa et al. |
| 4,054,066 A * | | 10/1977 | Carter .............................. 82/158 |
| 4,054,068 A * | | 10/1977 | Carter .............................. 82/158 |
| 4,515,049 A * | | 5/1985 | Dietz et al. ....................... 82/153 |
| 4,583,434 A * | | 4/1986 | Moody et al. ................... 82/158 |
| 4,759,244 A * | | 7/1988 | Engibarov ....................... 82/154 |
| 5,092,206 A * | | 3/1992 | Ronzoni .......................... 82/160 |
| 5,551,795 A * | | 9/1996 | Engibarov ....................... 82/158 |
| 5,938,381 A | | 8/1999 | Diehl et al. |
| 6,363,821 B1 * | | 4/2002 | Greenwald et al. ............. 82/1.11 |
| 7,036,408 B2 * | | 5/2006 | Savoie et al. .................... 82/1.11 |
| 7,168,351 B2 | | 1/2007 | Hirayama et al. |
| 7,440,814 B2 * | | 10/2008 | McPherson et al. ............. 451/42 |
| 7,480,970 B2 * | | 1/2009 | Meyer et al. ..................... 82/904 |
| 7,597,033 B2 * | | 10/2009 | Savoie et al. .................... 82/1.11 |
| 7,712,401 B1 * | | 5/2010 | Greenwald ....................... 82/1.11 |
| 2006/0207395 A1 * | | 9/2006 | Place et al. ....................... 82/113 |

FOREIGN PATENT DOCUMENTS

| | | | |
|---|---|---|---|
| EP | 0 849 038 A2 | | 6/1998 |
| EP | 1 386 694 A1 | | 2/2004 |
| EP | 1719584 A1 * | | 11/2006 |
| EP | 1719585 A2 * | | 11/2006 |
| JP | 2006312233 A * | | 11/2006 |
| JP | 2006313540 A * | | 11/2006 |
| JP | 2007125690 A * | | 5/2007 |
| WO | WO 02/06005 A1 | | 1/2002 |

* cited by examiner

*Primary Examiner* — Jason Daniel Prone

(74) *Attorney, Agent, or Firm* — Reising Ethington P.C.

(57) ABSTRACT

A fast tool arrangement, in particular for lathes for machining optical workpieces, has a carriage, which for linear reciprocating movements is guided in a housing on bearing elements stationary in relation to the housing, and which at its outer end carries a holder for a tool or workpiece and at its inner end is actively connected with a moving coil drive. The carriage has the cross-section of a T-profile with plane-parallel flange and web faces wherein the bearing elements are arranged in pairs on both sides of the profile web and the profile flange.

18 Claims, 9 Drawing Sheets

FAST TOOL SERVO

FIELD OF THE INVENTION

The invention relates to a fast tool arrangement, commonly referred to in the trade as a fast tool servo, in particular for lathes for machining optical workpieces. In particular the fast tool arrangement is provided for machining plastic spectacle lenses.

A fast tool arrangement is an additional machine component for a highly dynamic movement of the tool in the feed direction during the turning process. In particular for use in ultra-precision machines, with such a fast tool arrangement non-rotationally symmetrical forms such as free-form surfaces, toric surfaces, atoric surfaces and similar surfaces can be generated by turning processes. Rotational and linear fast tool systems are known. The present invention relates to a linear system.

DESCRIPTION OF THE PRIOR ART

Such fast tool arrangements are known for example from WO 02/06005 A1. In the embodiment example according to FIG. 7 of this publication, the carriage (also called the "shuttle") is guided and mounted on flat pneumatic bearing elements. Pneumatic bearing elements are particularly suitable for such arrangements because of their excellent properties. Practically no friction and no wear occur thereon because the mounting and guidance take place contactless. Pneumatic bearing elements are soundless and vibration-free in operation. High movement speeds and high acceleration/decelerations, such as are present in fast tool arrangements, become possible. Pneumatic bearings also require no lubrication.

In the fast tool arrangement known from WO 02/06005 A1, only two pneumatic bearing elements are provided on either side of the carriage and have a substantial spacing from each other so that the heat inevitably generated by the moving coil drive leads to substantial dimension changes, harmful to working accuracy, of the metal carriage arranged between the pneumatic bearing elements due to thermal expansion. In order to avoid seizing of the carriage on the pneumatic bearing elements, a greater air gap is required which however reduces the rigidity of the system.

BACKGROUND OF THE INVENTION

Starting from the prior art according to WO 02/06005 A1, the invention is based on the object of providing a fast tool arrangement of the design and application described initially in which carriage heating leads only to very low dimensional changes, so that high requirements imposed on the precision and quality of the optical surfaces generated can be fulfilled, and which allows a high precision linear guidance and mounting of the carriage, even with large stroke paths, and a low carriage mass.

SUMMARY OF THE INVENTION

According to one aspect of the present invention, there is provided a fast tool arrangement including a carriage which is adapted for linear reciprocating movements and is guided in a housing on bearing elements stationary in relation to the housing, the carriage having an outer end which carries one of a holder for a tool and a workpiece, and has an inner end which is actively connected with a moving coil drive, wherein the carriage has a cross-section of a T-profile with plane-parallel flange and web faces, wherein the bearing elements are arranged in pairs on both sides of the profile web and profile flange.

In a fast tool arrangement according to the invention it is proposed that the carriage has the cross-section of a T-profile with plane-parallel flange faces and plane-parallel web faces, the bearing elements being arranged in pairs on both sides of the profile web and profile flange. The term "plane-parallel" means in this context having opposite surfaces exactly plane and parallel, as a piece of glass.

Due to this design of the carriage as a T-profile, with small compact dimensions of the carriage which therefore has only a low mass, a high rigidity of the carriage is achieved. Due to the plane-parallel flange and web faces, these faces can be used in the full width and length for bearing and guidance of the carriage on the bearing elements. Because of the T-form profile of the carriage, the bearing element pairs—namely one pair on the profile web and two pairs on the profile flange i.e. in total six bearing elements—can be provided in a compact arrangement. As the bearing elements of each pair enclose between them only the material thickness of the web or flange respectively, thermal expansion only has a very slight influence on the dimensions of the carriage and hence on the guide accuracy of the carriage on the bearing elements.

As part of the inventive concept, the housing for the bearing and guidance of the carriage has a T-shaped recess adapted to the dimensions of the carriage and bearing element. Preferably the housing is formed in two parts, with an upper part with the T-shaped recess arranged therein and a plate-shaped lower part, wherein the lower part closes the T-shaped recess on its flange side.

The carriage is preferably composed of two plane-parallel plates which are connected together by bolts. The carriage and housing are constructed of geometrically simple rectangular components, which allows a precise and nonetheless economic production.

The carriage, that is compact and hence lightweight because of its construction, can have a further advantageous weight reduction by the provision of cylindrical longitudinal bores in the profile web substantially over its entire length and transverse bores in the profile flange over its entire width. In a plate-like screwed construction, it is suitable to guide the bolts through these next to the transverse bores in the plate forming the profile flange.

An adapted housing is allocated to the carriage and to the moving coil drive. These two housings are preferably connected together forming a gap, whereby the vibrations generated by the rapid movements of the moving coil drive are not transmitted directly to the fast tool arrangement but absorbed via the mass of the machine frame with which both housings are firmly connected by bolts.

To cool the outer casing surface of the permanent magnet of the moving coil drive with air or a coolant fluid, suitably an arrangement is provided, whereby a sealed ring chamber formed for the passage of a coolant is provided between an outer casing surface of the permanent magnet of the moving coil drive and the drive housing surrounding the permanent magnet. But in a further embodiment of the invention, air cooling is also provided for the moving coil, wherein suitably the cooling air, together with the outlet air from the bearing elements formed as pneumatic bearing elements and the air displaced by the moving coil, is guided towards the outside through an immersion ring chamber of the moving coil and via a back plate closing the drive housing on its outer end.

To eliminate an unhindered flow of heat from the moving coil drive to the fast tool arrangement, it is advantageous if the carriage is bolted to the moving coil with the interposition of an isolator plate of a thermally isolating plastic that is thermally stable in form and dimensions. The isolator plate suitably has grooves to accommodate the connecting cables of the moving coil guided to the outside from the drive housing.

To limit the travel length of the common path of the carriage and moving coil, in both movement directions in a further refinement of the invention stop elements may be provided.

These travel-limiting stop elements that are stationary in relation to the housing are provided for the carriage and the moving coil firmly connected thereto.

A stop element which is active in one direction of movement is a stop rod guided concentrically through and protruding beyond the permanent magnet, the stop surface of which faces the inner end of the moving coil, and the outer end of which is connected with the back plate of the drive housing via damping spring elements.

The stop elements effective in the other direction of movement are formed by buffer elements of elastomer material that are attached to the housing and face the adjacent face surface of the moving coil.

In another aspect of the invention, there is provided a fast tool arrangement including a carriage which is adapted for linear reciprocating movements and is guided in a housing on bearing elements stationary in relation to the housing, the carriage having an outer end which carries one of a holder for a tool and a workpiece, and has an inner end which is actively connected with a moving coil drive; wherein the moving coil drive is surrounded by a drive housing that is connected to the housing for the carriage with a gap in between the two housings, and wherein the two housings are bolted to a machine frame of the fast tool arrangement.

BRIEF DESCRIPTION OF DRAWINGS

Further details of the invention are explained in more detail below with reference to the drawings showing an application example of the fast tool arrangement and an embodiment example of the fast tool arrangement. These show.

DETAILED DESCRIPTION OF THE PREFERRED EMBODIMENT

Figure 1:
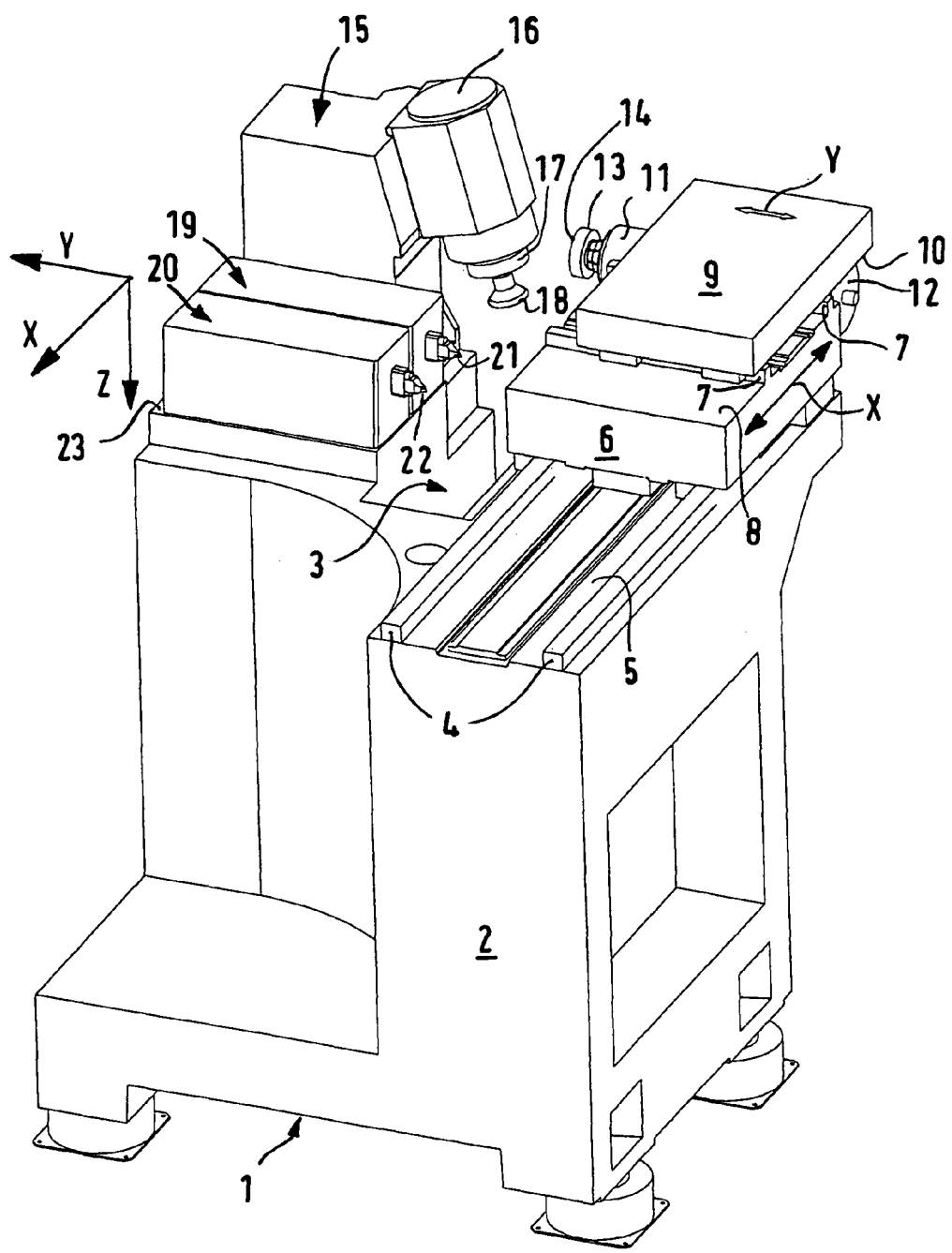
FIG. 1 a perspective view of a machine fitted with two fast tool arrangements according to the invention for machining optical workpieces, in particular plastic spectacle lenses, FIG. 2 a side view of a fast tool arrangement with moving coil drive and a tool holder attached to the fast tool arrangement which is fitted with a turning tool, FIG. 3 a cross-section view along section line III-III in FIG. 2, FIG. 4 a top view of the fast tool arrangement with moving coil drive according to FIG. 2 but without tool holder, FIG. 5 a longitudinal section view along section line V-V in FIG. 4, FIG. 6 an enlarged extract according to the extract circle VI in FIG. 5, FIG. 7 an enlarged longitudinal section through the carriage shown in FIG. 5, FIG. 8 a front view of the inner end of the carriage in FIG. 7, FIG. 9 an outer front view of the fast tool arrangement shown in FIG. 4, and FIG. 10 an outer front view of the moving coil drive shown in FIG. 4.

First to explain the application example of the fast tool arrangement, reference is made to FIG. 1 which shows in diagrammatic view a CNC-controlled machine 1 in particular for surface machining of plastic spectacle lenses 13 in a rectangular Cartesian co-ordinate system. In the co-ordinate system the letters x, y and z indicate the width direction (x), length direction (y) and height direction (z) of the machine 1 and its components.

The machine 1 has a machine frame 2 with a machining range 3. On the right-hand side of the machining area 3 in FIG. 1, two guide rails 4 which extend parallel to each other in the (horizontal) width direction x, are attached to an upper mounting face 5 of the machine frame 2. An x-carriage 6 that can be adjusted CNC-position-controlled by allocated CNC drive and control elements (not shown) in both directions of an x-axis, is mounted displaceably on the guide rails 4.

Two further guide rails 7 which extend parallel to each other in the (also horizontal) longitudinal direction y and perpendicular to the guide rail 4 are attached to an upper mounting face 8 of the x-carriage 6. In a compound table arrangement, a y-carriage 9 that can be adjusted CNC-position-controlled by allocated CNC drive and control elements (not shown) in both directions of a y-axis, is mounted displaceably on the guide rails 7.

Attached on a lower mounting face 10 of the y-carriage 9 is a workpiece spindle 11 which can be driven in rotation by means of an electric motor 12 with CNC-controlled speed and rotation angle. The workpiece rotation axis is aligned with the y-axis. For machining in particular of the prescription face 14 of the spectacle lens 13, the spectacle lens 13 blocked on a blocking piece is held by means of a clamping device on the end of the workpiece spindle 11 protruding into the machining area 3 such that it can rotate simultaneously with the workpiece spindle 11.

On the left-hand side of the machining area 3 shown in FIG. 1, a milling unit 15 is mounted on the machine frame 2. The milling unit 15 has a milling spindle 17 that can be driven speed-controlled by means of an electric motor 16, on the end of which spindle protruding into the machining area 3 is mounted a milling cutter 18. By means of the milling unit 15 a milling process can be performed on the spectacle lens 13, which process following the teaching of EP 0 758 571 A1 comprises a plunge machining step, in which the milling tool 18 rotating under speed control about the cutter rotation axis and the spectacle lens 13 rotating under rotational angle control about the workpiece rotation axis, can be moved relative to each other position-controlled in at least one of the two axial directions x and y such that the cutting of the milling tool 18 at least in the area of the outer edge of the spectacle lens 13 generates an annular dish-like recess before the milling tool 18 in a forming work step is guided over the spectacle lens 13 from outside to inside along a spiral path, by control of the movement track of the spectacle lens 13 in the x and y axes, in order to remove further material. Optional work steps preferably performed at the same time as this milling process are edge machining and faceting of the spectacle lens 13. In edge machining by means of a rotating milling cutter 18, machining of the spectacle lens blank is performed e.g. on the peripheral contour stipulated by the spectacle frame form, whereas in faceting the upper or inner peripheral edge of the spectacle lens blank is chamfered by means of the rotating milling cutter 18.

In the embodiment example according to FIG. 1, two fast tool arrangements 19 and 20 are provided in parallel arrangement. With the turning tools 21 and 22 that are attached to the fast tool arrangement and reach into the machining area 3, the prescription surface 14 of the spectacle lens 13 previously machined by the milling unit 15 can be finish-machined in turning. During this turning machining, surface qualities can be achieved which come close to those achievable with conventional polishing processes. The fast tool arrangements 19 and 20 are mounted on a mounting face 23 of the machine frame 2. Otherwise the working method of the machine shown in FIG. 1, including the working method of the fast tool arrangement known in itself, are not the object of the present invention so to that extent no further explanations of the working processes need be given at this point. The design of the fast tool arrangements 19 and 20 designed accordingly to this extent, is described in more detail in the example of the arrangement 19 in the following.

Figure 2:
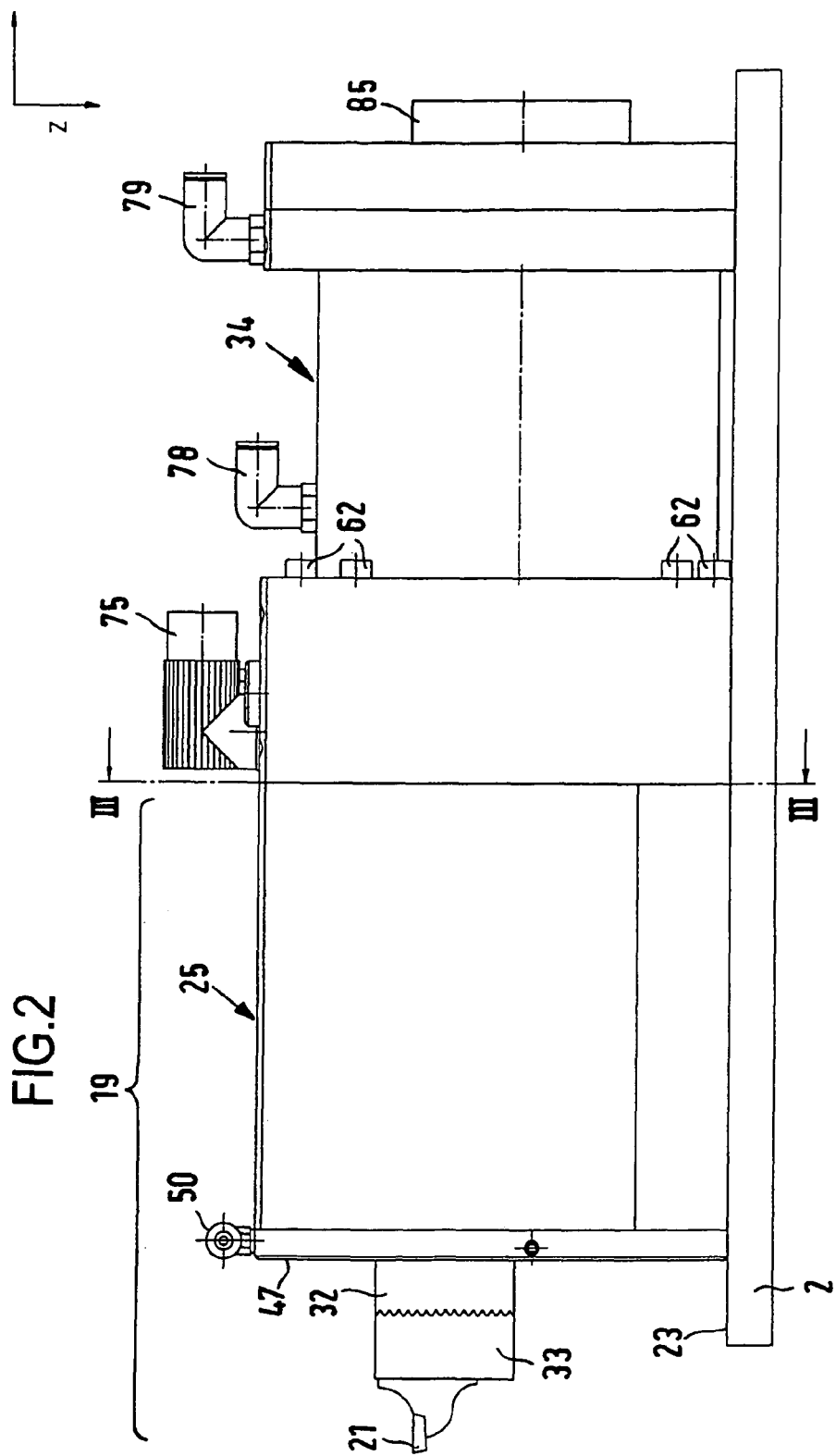
Figure 5:
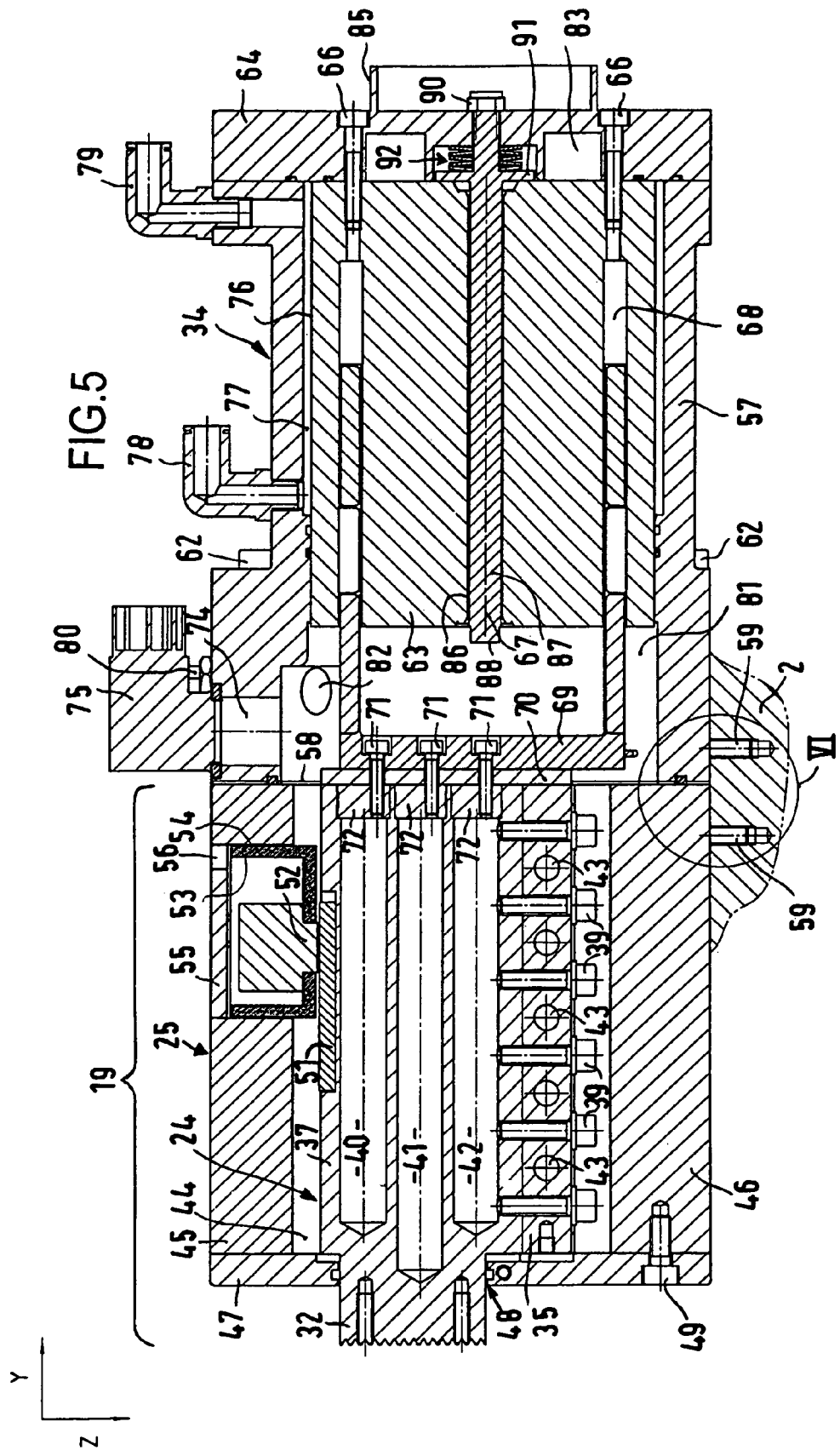

As evident in particular from FIG. 5, the fast tool arrangement 19 has a carriage 24 which guides the turning tool 21 (FIG. 2). The carriage 24 in the embodiment example shown is guided for linear reciprocating movements in a housing 25 on six flat pneumatic bearing elements 26 to 31, the arrangement of which is evident in the housing 25 in FIG. 3. The carriage 24 carries on a projection 32 a holder 33 screwed thereto for the turning tool 21. At its inner end the carriage 24 is actively connected with a moving coil drive 34 described in more detail below.

Figure 7:
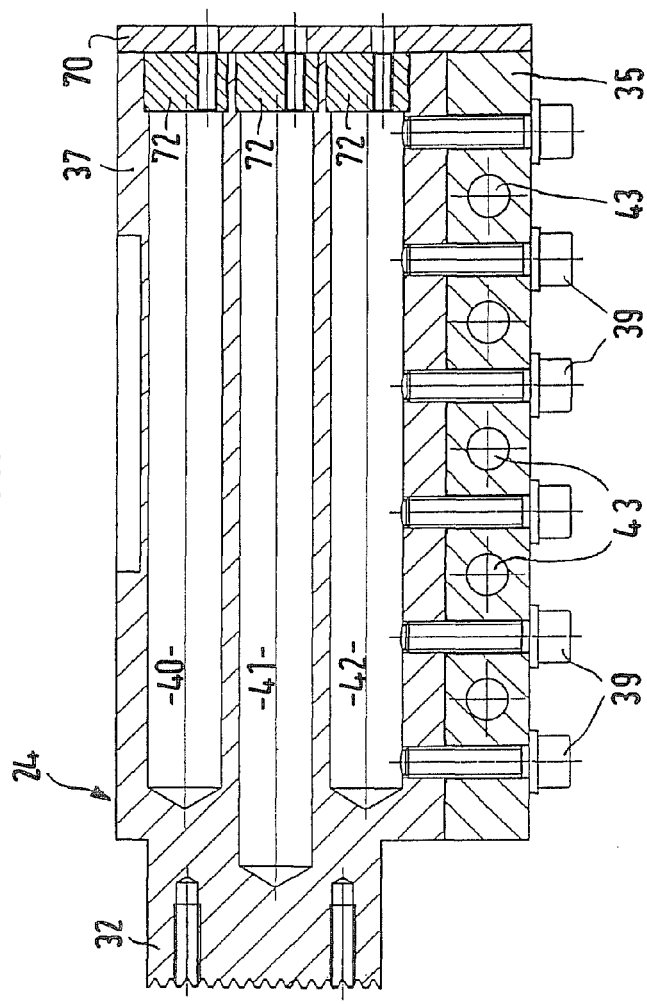
Figure 8:
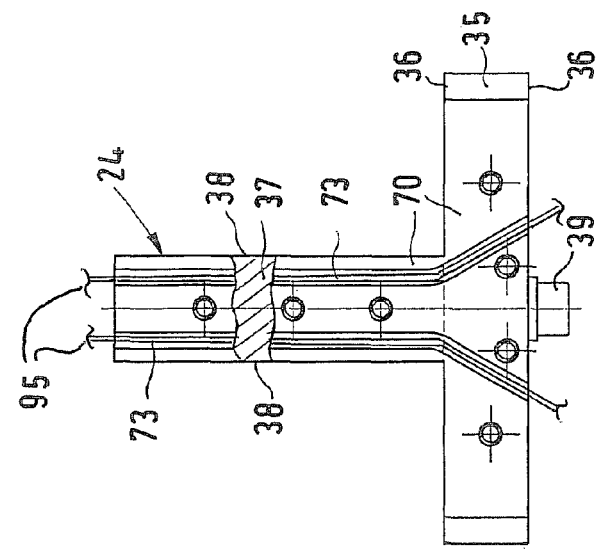

The carriage 24 has the cross-section of a T-profile with plane-parallel flange faces 36 on the profile flange 35 and plane-parallel web faces 38 on the profile web 37 as shown in FIG. 8. The carriage 24 is composed of two plane-parallel plates which are arranged perpendicular to each other in T-form and form the profile flange 35 and profile web 37. The two plates preferably comprise aluminum and are connected together by bolts 39 as shown in FIGS. 3, 5, 7 and 8.

The construction of the carriage 24 from two plates allows economic production of the plane-parallel flange faces 36 and the plane-parallel web faces 38 which form the guide faces of the carriage 24. Very close tolerances with regard to parallelity and flatness of the flange faces 36 and web faces 38 can be achieved by lapping machining. After machining, the two plates can be given a hard wear-protection layer by hard anodic oxidization which can be followed by further fine lapping, resulting in a surface which is of optical quality with regard to flatness, parallelity and roughness. The T-profile of the carriage 24 formed in this way allows practically the entire flange and web faces 36, 38 to be available as bearing faces, giving optimum load bearing capacity and very high rigidity of the guide. This rigidity is of advantage in particular because of the high process forces in the x and y direction that can occur during high performance cutting of plastic spectacle lenses.

To minimize weight, the plate forming the profile web 37 is provided with cylindrical longitudinal bores 40 to 42 substantially over its entire length, while the plate forming the profile flange 35 is provided with transverse bores 43 over its entire width, as shown in FIGS. 5 and 7. The arrangement is made such that the bolts 39 are guided next to or between the transverse bores 43 through the profile flange 35.

Figure 3:
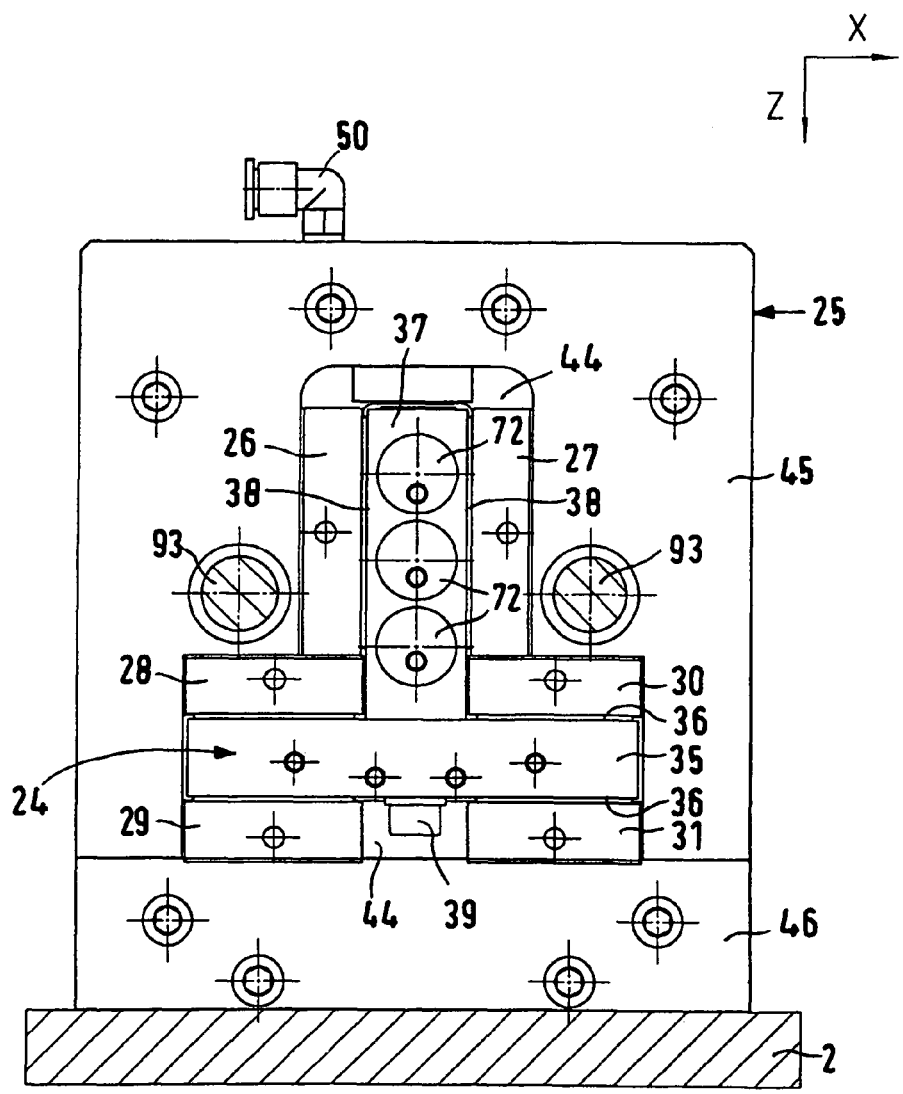
Figure 9:
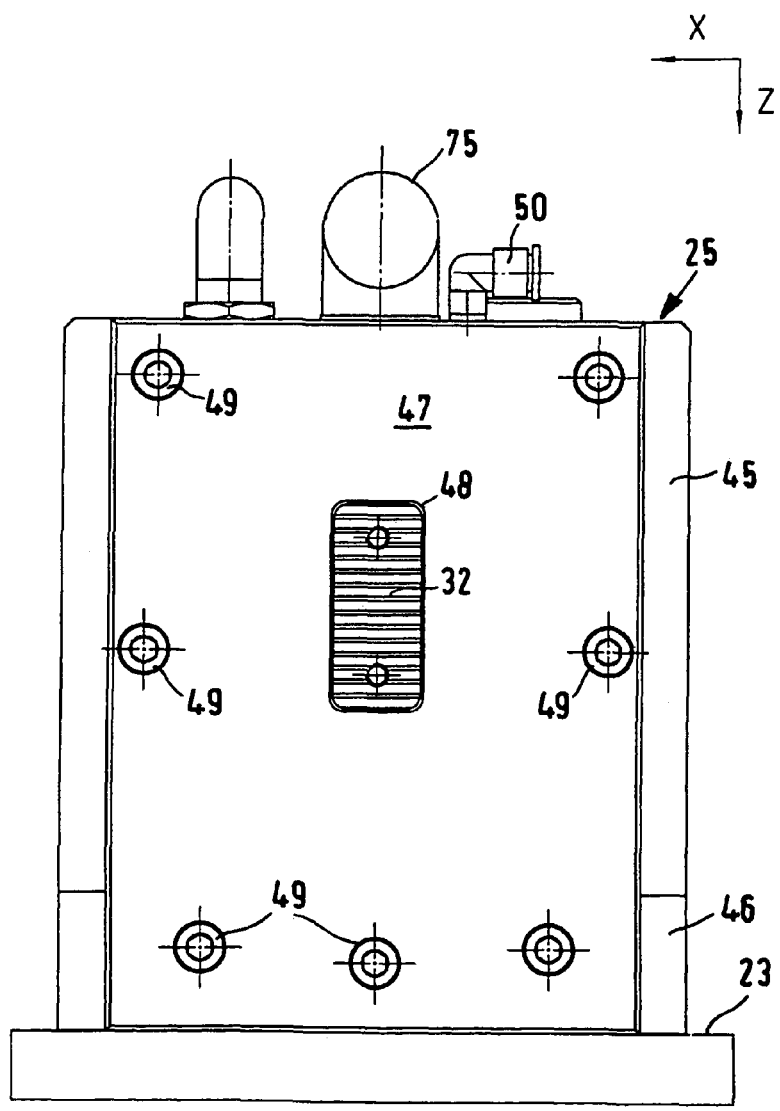

The housing 25 has a T-shaped recess 44 extending over its length to hold the carriage 24 and the pneumatic bearing elements 26 to 31 as shown in FIG. 3 in conjunction with FIG. 5. The housing 25 comprises an upper part 45 and a lower part 46, wherein the T-shaped recess 44 is in the upper part 45 and the lower part 46 is formed plate-like and closes recess 44 on the flange side from below. The recess 44 is closed on the outside by a face plate 47 which is provided with an opening 48 for passage of the projection 32 to the outside. The face plate 47 is firmly connected via bolts 49 with the upper part 45 and the lower part 46 of the housing 25, as shown in FIG. 9 in conjunction with FIG. 5.

The pneumatic bearing elements 26 to 31 guiding and bearing the carriage 24 are arranged in pairs on both sides of the profile web 37 or profile flange 35. The pneumatic bearing element pair 26, 27 is allocated to the profile web 37, while the pneumatic bearing element pairs 28, 29 and 30, 31 are allocated to the profile flange 35. Preferred pneumatic bearing elements 26 to 31 are porous pneumatic bearings in flat rectangular design by New Way Precision/IBS Precision Engineering. The pneumatic bearing elements 26 to 31 are glued directly in the recess 44 of the housing 25 by means of a reaction resin adhesive and require no further adjustment. The pneumatic bearing elements 26 to 31 are connected pneumatically to the face plate 47 via a connecting piece 50 in which the air is guided to the six pneumatic bearing elements 26 to 31 via corresponding channels (not shown). As an alternative to the specified flat pneumatic bearing elements, structured bearing elements can also be used which as well as gases can also be operated with fluids as hydrostatic bearings.

Figure 4:
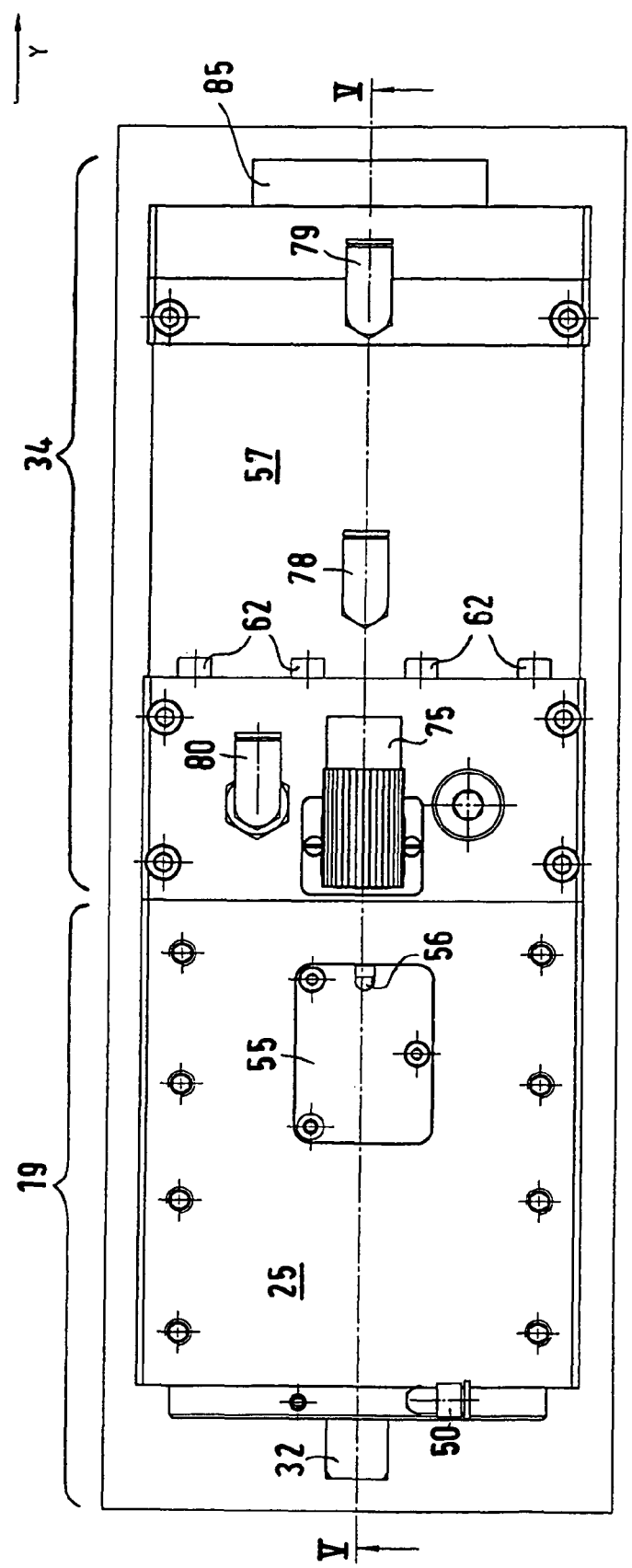

Arranged on the top face of the carriage 24 is a linear path measurement system e.g. a glass measuring rod 51 which is preferably let into the profile web 37. Allocated to the glass measuring rod 51 is a read head 52 which is adjustable relative to the glass measuring rod 51 and sits in a read head holder 53 that in turn is introduced in a housing recess 54. The housing recess 54 can be closed by a cover 55 with an opening 56 through which the cables of the read head 52 are guided to the outside. The arrangement of the path measurement system is shown in FIGS. 4 and 5.

Figure 6:
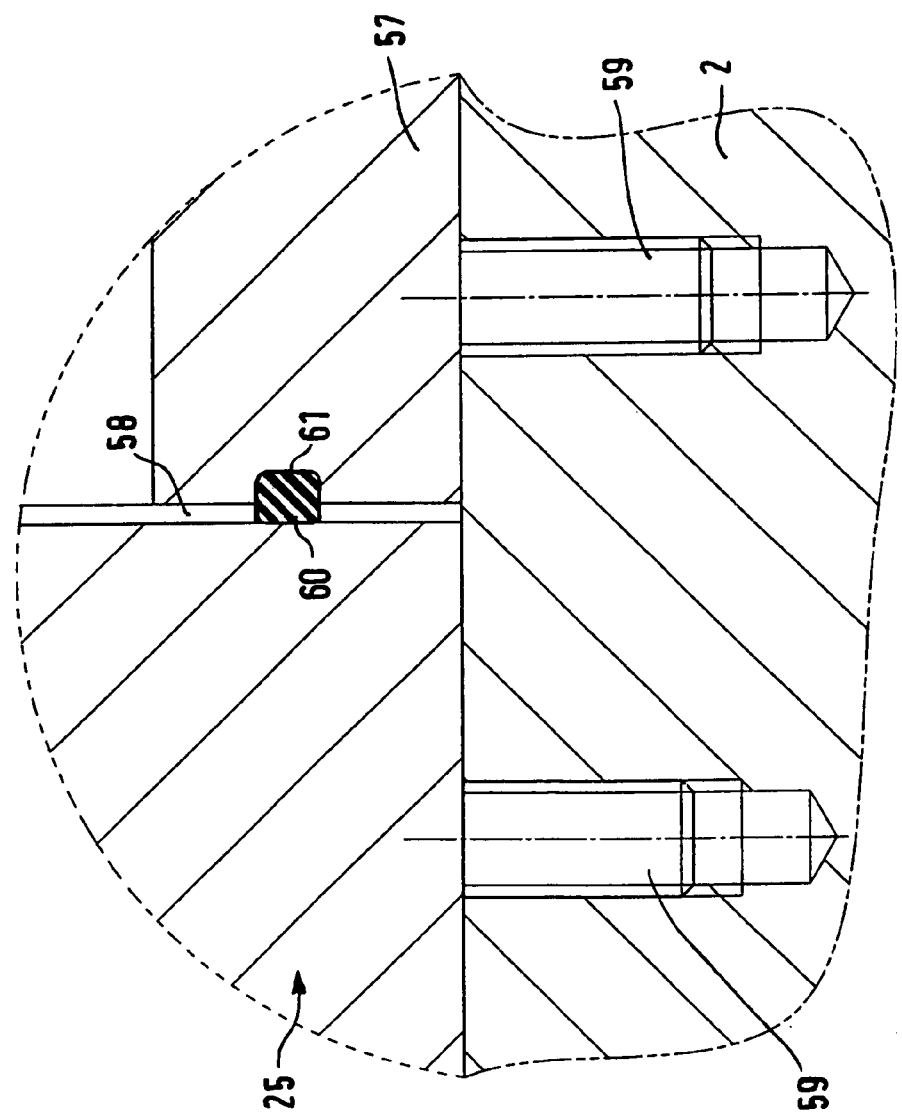

The moving coil drive 34 is surrounded by a tubular drive housing 57 which is connected to the housing 25 for the carriage 24, forming a gap 58. Both housings 25 and 57 are bolted to the machine frame 2 via screw bolts 59 as shown in FIGS. 5 and 6. The two housings 25 and 57 are sealed against each other by a foam rubber bead 60 on the facing surfaces of the two housings. The bead 60 is laid in a groove 61 in one of the housing faces. The two housings 25 and 57 are connected together by means of the bolts 62 evident in particular from FIG. 2.

The two housings 25 and 57 can be firmly tightened onto each other by the bolts 62 but the desired gap 58 would not then be formed. Preferably therefore during assembly a slight gap is set between the facing housing surfaces by the interposition of a spacer film. After mounting of the fast tool arrangement 19 and the moving coil drive 34 on the machine frame 2, the bolts 62 are released and the spacer film removed again. In this way the narrow gap 58 remains between the two housings. As a result, the vibrations initiated by the movements of the moving coil drive 34 are not transmitted directly to the housing 25 of the fast tool arrangement 19 and the measuring system therein but are absorbed by the mass of the machine frame 2.

Figure 10:
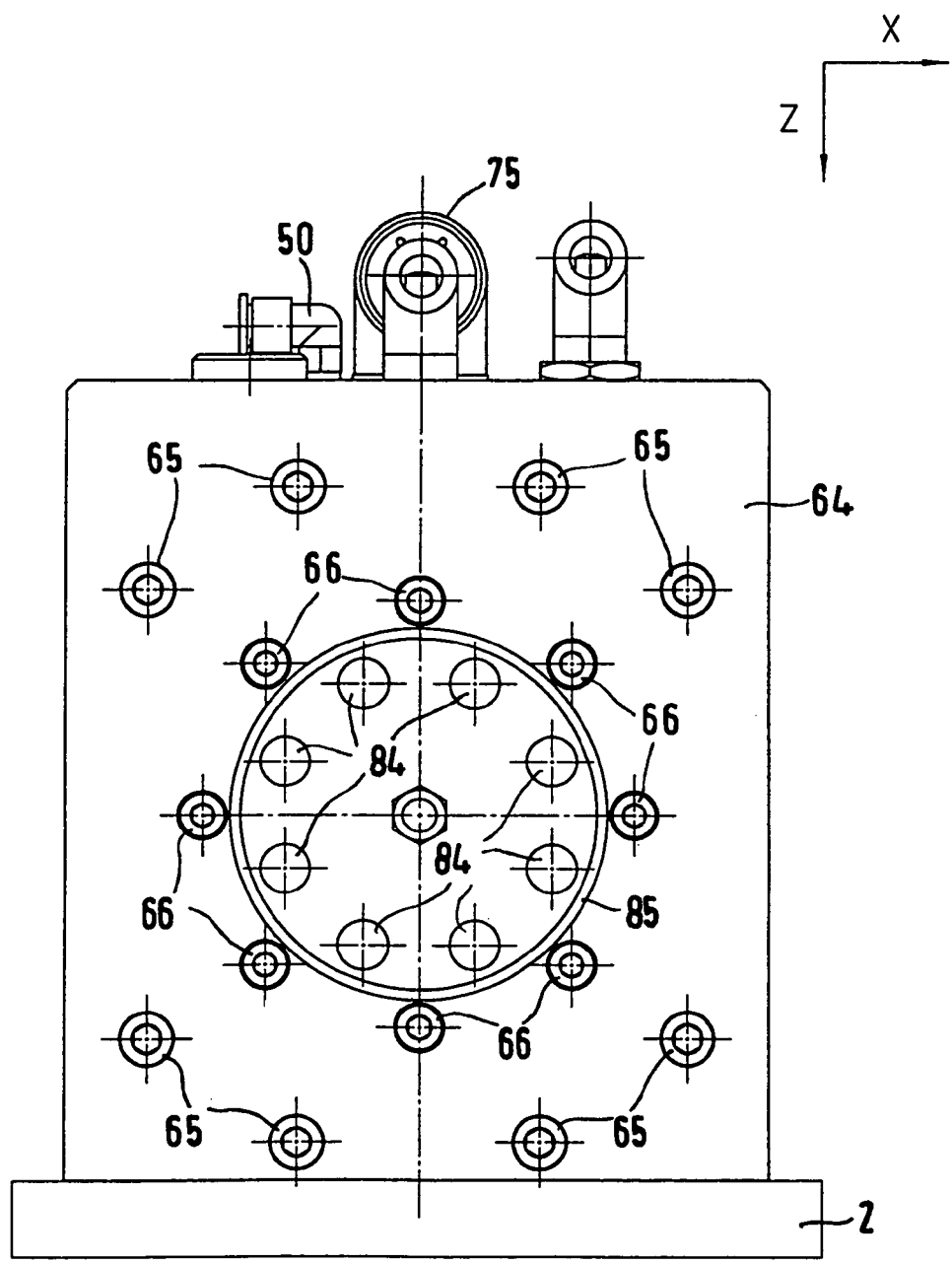

The permanent magnet 63 of the moving coil drive 34 is firmly connected with the drive housing 57 together with a back plate 64 closing one of the drive housings 57 by means of bolts 65 and 66 as shown in FIG. 5 in conjunction with FIG. 10. The permanent magnet 63 has an annular chamber 68 concentric with its central axis 67 that holds the moving coil 69 with radial play and axially mobile therein.

The carriage 24 is bolted to the moving coil with the interposition of an isolator plate 70. The titanium bolts 71 provided for this are screwed into plugs 72 which are glued in the profile web 37 of the carriage 24. The isolator plate 70 comprises a thermally isolating, heat-resistant plastic that is stable in form and dimensions (KETRON® PEEK-HPV, trade name of the manufacturer Quadrant Engineering Plastic Products). Provided in the isolator plate 70 are grooves 73 to accommodate the supply cables 95 of the moving coil 69 guided to the outside of the drive housing 57. These cables 95 are guided out of the drive housing 57 in a loop which does not hinder the movement of the carriage 24, via an upper opening 74 of the drive housing 57 by means of a plug fitting 75 (FIG. 5).

A sealed annular chamber 77 formed for the passage of air or coolant is provided between the outer casing surface 76 of the permanent magnet 63 of the moving coil drive 34 and the drive housing 57 surrounding the permanent magnet. The supply and extraction of the coolant takes place via L-screw fittings 78 or 79 as shown in FIG. 5.

The coil 69 of the moving coil drive 34 is air-cooled. For the supply of cooling air an air inlet connector 80 is provided on the drive housing 57 that supplies cooling air to the annular chamber 81 surrounding the moving coil 69 via an opening 82 as shown in FIG. 5. The cooling air enters the immersion ring chamber 68 and via channels enters a collecting ring chamber 63 in the back plate 64 and is extracted therefrom via vent bores 84 shown in FIG. 10. The vent bores 84 are located within an outer connecting piece 85 that is provided for the attachment of an extraction air hose (not shown). Together with the cooling air, via the air path described the extraction air from the pneumatic bearing elements 26 to 31 and the air displaced by the moving coil 69 are guided to the outside.

For the carriage 24 and the moving coil 69 connected therewith, travel-limiting stops fixed in relation to the housing are provided which are described below with reference to FIGS. 5 and 3. The step element active in one movement direction is a stop rod 87 guided concentrically through the permanent magnet 63 via a corresponding bore 86, and the stop face 88 of which faces the inner end of the moving coil 69. The outer end of the stop rod 87 is guided to the outside through the back plate 64 and fitted with a screw-on self-locking nut 90. A stop-damping support of the stop rod 87 on the back plate 64 is ensured by a ring flange 91 attached to the stop rod 87 and lying on a disc spring packet 92 that is supported on the back plate 64. The stop elements active in the other movement direction are two buffer elements 93 of elastomer (Schwingmetall® elements, trade name of the company Continental-Gummi-Werke AG) which are attached to the housing 25 and face the adjacent front of the moving coil 69.

In summary, a fast tool arrangement is provided, in particular for lathes, for machining optical workpieces, with a carriage that is guided for linear reciprocating movements in a housing on bearing elements stationary in relation to the housing, and that at one outer end has a holder for a tool or workpiece and at its inner end is actively connected with a moving coil drive, it is provided that the carriage has the cross-section of a T-profile with plane-parallel flange and web faces, the bearing elements being arranged in pairs on both sides of the profile web and the profile flange.

Other variations and modifications are possible without departing from the scope and spirit of the present invention as defined by the appended claims.

I claim:

1. A lathe comprising a fast tool servo and a machine frame, wherein said fast tool servo comprises a drive housing,
   a moving coil drive which is surrounded by said drive housing,
   a carriage housing,
   a carriage which is adapted for linear reciprocating movements and is guided in said carriage housing by bearing elements stationary in relation to said carriage housing,
   said carriage having an outer end which carries one of a holder for a tool and a workpiece, and further having an inner end which is actively connected with said moving coil drive,
   wherein said carriage has a cross-section of a T-profile with a profile web and a profile flange which are arranged perpendicular to each other, said profile web having opposite web faces that are plane and parallel to each other, and said profile flange having opposite flange faces that are plane and parallel to each other, and
   wherein said bearing elements are arranged in pairs on both sides of said profile web, facing said web faces, and on both sides of said profile flange, facing said flange faces.

2. A lathe according to claim 1, wherein said drive housing is connected to said carriage housing with a gap in between said drive housing and said carriage housing and wherein said drive housing and said carriage housing are bolted to said machine frame.

3. A fast tool servo comprising:
   a drive housing,
   a moving coil drive which is surrounded by said drive housing,
   a carriage housing,
   a carriage which is adapted for linear reciprocating movements and is guided in said carriage housing by bearing elements stationary in relation to said carriage housing,
   said carriage having an outer end which carries one of a holder for a tool and a workpiece, and further having an inner end which is actively connected with said moving coil drive,
   wherein said carriage has a cross-section of a T-profile with a profile web and a profile flange which are arranged perpendicular to each other, said profile web having opposite web faces that are plane and parallel to each other, and said profile flange having opposite flange faces that are plane and parallel to each other, and
   wherein said bearing elements are arranged in pairs on both sides of said profile web, facing said web faces, and on both sides of said profile flange, facing said flange faces.

4. A fast tool servo according to claim 3, wherein the carriage housing has a length dimension, there being a T-shaped recess extending over the length of the carriage housing to accommodate the carriage and the bearing elements.

5. A fast tool servo according to claim 4, wherein the carriage housing comprises an upper part with the T-shaped recess arranged therein and a plate-shaped lower part, which closes the T-shaped recess.

6. A fast tool servo according to claim 3, wherein the carriage comprises two plates which are arranged perpendicular to each other to form the T-profile, one of said plates forming the profile web and the other of said plates forming the profile flange.

7. A fast tool servo according to claim 6, wherein the two plates of the carriage are screwed together by bolts.

8. A fast tool servo according to claim 7, wherein said plate forming the profile web has a length dimension and is provided with cylindrical longitudinal bores substantially over the entire length of the profile web and said plate forming the profile flange, has a width dimension and is provided with transverse bores over the entire width of the profile flange.

9. A fast tool servo according to claim 8, wherein the bolts are each guided through the plate forming the profile flange next to the transverse bores.

10. A fast tool servo according to claim 3, wherein the moving coil drive comprises a permanent magnet having an outer surface, said drive housing surrounding the permanent magnet, and wherein a sealed ring chamber is formed for passage of a coolant between said outer surface and said drive housing.

11. A fast tool servo according to claim 3, wherein the bearing elements are pneumatic bearing elements and the moving coil drive is air-cooled by cooling air.

12. A fast tool servo according to claim 11, wherein the cooling air is guided to an outside together with extraction air from the pneumatic bearing elements and air displaced by the moving coil, through an immersion ring chamber of the moving coil drive and via a back plate closing an outer end of said drive housing.

13. A fast tool servo according to claim 3, wherein the moving coil drive has a moving coil and wherein the carriage is bolted to the moving coil with an isolator plate being interposed between the carriage and the moving coil.

14. A fast tool servo according to claim 13, wherein the moving coil has supply cables, and grooves are provided in the isolator plate to accommodate the supply cables of the moving coil.

15. A fast tool servo according to claim 3, wherein the moving coil drive has a moving coil and wherein travel-limiting stop elements that are stationary in relation to the carriage housing are provided for the carriage and the moving coil, firmly connected to the carriage wherein one of the stop elements is effective in a first direction of movement of the carriage and another of the stop elements is effective in a second direction of movement of the carriage.

16. A fast tool servo according to claim 15, wherein the moving coil has an inner end and an outer end wherein said ene stop element effective in said first direction of movement is a stop rod guided concentrically through and protruding beyond a permanent magnet of the moving coil drive said stop rod having a stop surface which faces the inner end of the moving coil, and wherein the drive housing has a back plate the outer end of the moving coil being connected with the back plate via damping spring elements.

17. A fast tool servo according to claim 15, wherein said stop element effective in said second direction of movement is formed by buffer elements of elastomer material that are attached to the carriage housing and face the moving coil.

18. A fast tool servo according to claim 3 and being incorporated in a lathe for machining of optical workpieces.

* * * * *

UNITED STATES PATENT AND TRADEMARK OFFICE
CERTIFICATE OF CORRECTION

| | | |
|---|---|---|
| PATENT NO. | : 8,056,453 B2 | |
| APPLICATION NO. | : 11/586472 | |
| DATED | : November 15, 2011 | |
| INVENTOR(S) | : Marc Savoie | |

It is certified that error appears in the above-identified patent and that said Letters Patent is hereby corrected as shown below:

Claim 16, Column 10, Line 6 - Before "stop", delete "ene".

Signed and Sealed this
Twenty-first Day of February, 2012

David J. Kappos
*Director of the United States Patent and Trademark Office*